United States Patent
Jha et al.

[11] Patent Number: 5,772,915
[45] Date of Patent: Jun. 30, 1998

[54] GLASS COMPOSITIONS

[75] Inventors: Animesh Jha, Uxbridge; Wayne G. Jordan, Langley, both of United Kingdom

[73] Assignee: British Telecommunications public limited company, London, England

[21] Appl. No.: 702,464

[22] PCT Filed: Mar. 22, 1995

[86] PCT No.: PCT/GB95/00630

§ 371 Date: Mar. 20, 1997

§ 102(e) Date: Mar. 20, 1997

[87] PCT Pub. No.: WO95/26320

PCT Pub. Date: Oct. 5, 1995

[30] Foreign Application Priority Data

Mar. 25, 1994 [EP] European Pat. Off. ............... 94302167

[51] Int. Cl.$^6$ ............... C03C 3/32; C03C 4/00; C03C 13/04; H01S 3/17
[52] U.S. Cl. ................ 252/301.4 H; 501/40; 372/40; 372/6; 385/142; 359/343; 359/341
[58] Field of Search ........................ 501/40; 252/301.4 H; 372/40, 6; 395/142; 359/343, 341

[56] References Cited

U.S. PATENT DOCUMENTS

| | | | |
|---|---|---|---|
| 5,346,865 | 9/1994 | Aitken et al. | 501/40 |
| 5,351,335 | 9/1994 | Ohishi et al. | 385/142 |
| 5,560,868 | 10/1996 | Jordan et al. | 252/301.4 H |

FOREIGN PATENT DOCUMENTS

| | | |
|---|---|---|
| A 0350726 | 1/1990 | European Pat. Off. . |
| A 0568097 | 11/1993 | European Pat. Off. . |
| WO A 9207802 | 5/1992 | WIPO . |
| WO 94/19292 | 9/1994 | WIPO . |

OTHER PUBLICATIONS

Chemical Abstracts, vol. 109, No. 12, 19 Sep. 1988, Columbus, Ohio, US; abstract No. 97721r, p. 287, see abstract & JP,A,63 197 841 (Nippon Telegraph and Telephone Public Corp.) 12 May, 1988.

*Primary Examiner*—Melissa Bonner
*Attorney, Agent, or Firm*—Nixon & Vanerhye P.C.

[57] ABSTRACT

A halide glass composition contains iodide and/or bromide. In addition the halide content preferably includes chloride. The preferred metal composition includes no aluminium and 1–10 mole % of (In+Y). These compositions are used as hosts for rare earth lasing dopants, e.g, $Pr^{3+}$.

6 Claims, 1 Drawing Sheet

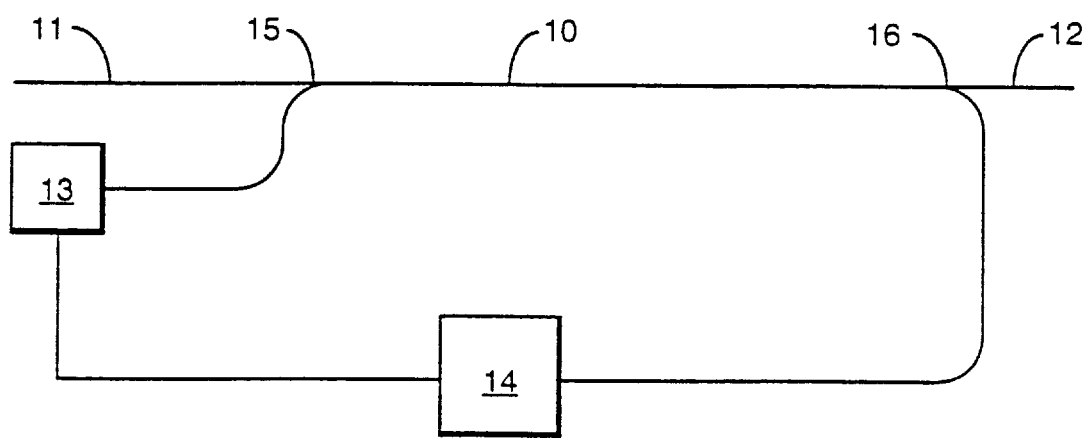

GLASS COMPOSITIONS

BACKGROUND OF THE INVENTION

1. Field of the Invention

This invention relates to halide glass compositions.

2. Related Art

Halide glasses have been known since 1978 and, among other things, they have been recognised as potentially useful for specialised optical waveguides, e.g. optical fibres. In particular some halide glasses have been found to display favourable properties as hosts for lasing dopants, e.g. rare earth metals such as $Er^{3+}$, $Nd^{3+}$ and $Pr^{3+}$. The lasing dopant is usually incorporated into the path region of a waveguide, e.g. the core of an optical fibre. An important end-use for the lasing glasses is as photonic amplifiers for telecommunications.

A wide range of halide glass compositions has been reported and the properties have been studied. It have been recognised that these glasses form good hosts for the rare earth elements as lasing species but the identification and selection of compositions having favourable properties remains difficult. In particular, the prior art has failed to identify glass compositions capable of lasing at 1300 nm with sufficient efficiency for use in telecommunications networks. This invention relates to compositions which have good properties.

It is now convenient to discuss the properties of the glass required in a lasing device such as a fibre amplifier. These properties will be considered under three different headings.

GENERAL GLASS PROPERTIES

It is important that all glasses shall remain in the glass state, ie. they shall not devitrify under conditions of use. It is also important that the glasses shall not be subject to crystallisation which might be considered as incipient devitrification. In addition it is also necessary that the compositions shall be suitable for use in glass forming and further processing. In particular it is necessary that a composition be stable in the melt, that it shall be capable of withstanding practical cooling rates and the conditions necessary for fibre forming, eg. during the pulling of a fibre preform into a fibre. It will also be apparent that chemical stability of the various glass components is important, eg it is desirable to avoid water soluble ingredients and, even more important, to avoid hygroscopic ingredients.

ATTENUATION

Lasing devices usually include waveguiding structures and it is clearly important to avoid unnecessary attenuation of either the signal wavelength or the pump wavelength. The requirement for low attenuation means that it is desirable to avoid components which have unnecessarily high absorptions at wavelengths of interest. It is also necessary to avoid scatter which emphasises some of the fundamental glass properties, ie. that the glass shall not form crystals even on a small scale.

HOST PROPERTIES

It also appears that there is interaction between the host glass and the lasing species. For example, the lasing species may undergo what is often called "non-radiative decay". This implies that the lasing species loses energy other than by the intended lasing transitions. Non-radiative decay represents a loss of energy and it is, therefore, an undesirable effect. It appears that the host glass may participate in non-radiative decay either in the sense that it may assist this undesired effect or help to inhibit it. Nevertheless, whatever the reason, it is established that the host glass can affect the efficiency of the lasing process and it is desirable to select the host so as to achieve good lasing efficiencies.

The hosting properties of the glass appear to have substantial effects upon the efficiency of a laser, eg. the ratio of signal power output to pump power input. This efficiency is of substantial importance in telecommunications because it may define the available gain of an amplifier. In experimental work, it is often convenient to utilise the lifetime of the excited state as a measure of the efficiency; the two quantities can be regarded as proportional to one another. In some theoretical papers it is considered that the multi-phonon absorption of the host affects the lifetime of the excited state and hence the efficiency of lasers based thereon.

It is important to recognise that the selection of a lasing composition, and especially the host glass, must take into account all of these features. Thus it is not necessarily appropriate to select ingredients solely on the basis of their effect upon the lasing performance if these components are liable to give rise to glass instability and high attenuations (which high attenuations may be the result of glass instability). In other words, selecting on the basis of one desirable feature is unlikely to produce acceptable results if this selection is accompanied by adverse effects.

European patent specification 535798 A2 is concerned with a fluoride fibre for use in an optical amplifier operable at wavelengths at 1300 nm. The lasing dopant is $Pr^{3+}$ either alone or in combination with $Yb^{3+}$, $Nd^{3+}$ or $Er^{3+}$. All of the examples relate to all-fluoride compositions but it is stated that some of the fluoride may be replaced by other halides. This publication emphasises that a higher refractive index is necessary in the core and that substantial amounts of $PbF_2$ are necessary to achieve this.

Japanese patent disclosure 63-107841 relates to halide glass fibres which have good transmission at wavelengths above 2 micrometres. There is no discussion of lasing or optical amplifiers and there is no mention of lasing dopants. It is stated that the halide content comprises fluorine with 0.1–10% molar of at least one element selected from chlorine, bromine and iodine. The glasses were obtained by adding $NH_4Cl$ and/or $NH_4Br$ and/or $NH_4Cl$ to a mixture of metal fluoride powders used to prepare a glass.

It has been mentioned that the prior art has disclosed and evaluated a very wide range of different halide (fluoride) glasses. This range includes a well recognised sub-group usually known as fluorozirconates. This sub-group of fluoride glasses has been recognised because they perform well in respect of all of the above features. The chemical composition of the fluorozirconate glasses will now be described.

The major component is ZrF4 which usually constitutes about 40–65 mole % of the total composition. In some variants the content of ZrF4 is reduced in order to adjust the refractive index, eg. by incorporating PbF2 or HfF2. (Refractive index adjustment is important in the design of waveguiding structures). A fluorozirconate composition usually contains about 10–39, eg. 15–25, mole % of an alkali metal fluoride, usually NaF. In addition, the composition often contains a substantial amount, eg. 10–25 mole % of BaF2 with smaller amounts, eg. 2–6 mole %, of LaF3 and AlF3. It is emphasised that the halide content of a fluorozirconate glass is entirely fluoride. In the case of a lasing composition, the fluorozirconate host will also contain up to 4 wt % of the cation of a rare earth metal, eg 0.001 to 0.1 wt % (ie 10–1000 ppm. wt) of $Pr^{3+}$.

SUMMARY OF THE INVENTION

This invention, which is more fully defined in the claims, is based on the unexpected recognition that the halide content of a halide glass can have substantial beneficial effects on the properties relevant to its use as a host for lasing. More specifically, it has been recognised that good performance is associated with glasses in which a major proportion (over 85 mole %) of the halide is provided as fluoride with minor amounts of bromide and/or iodide and, optionally, chloride. More quantitative information about the halide content will be given below.

BRIEF DESCRIPTION OF THE DRAWING

The drawing illustrates an optical amplifier configuration using this invention.

DETAILED DESCRIPTION OF EXEMPLARY EMBODIMENTS

In conventional halide glasses, the presence of the bromide, iodide and chloride tends to have an adverse effect on the glass forming properties of the composition, especially the stability. This adverse effect is substantially reduced by selection of the metal content of the glass and it is necessary to avoid high concentrations of aluminium and lead. Thus the aluminium and lead contents should each be below 0.2 mole %; preferably there is no aluminium and no lead present. While the presence of alkali metals, e.g. at concentrations of 10–39 mole %, is desirable, it is preferable that all the alkali metal content be provided as sodium.

Thus the invention is based upon the unexpected discovery that the combination of fluoride with iodide and/or bromide with low aluminium and lead contents gives stable glasses which have good properties as hosts for lasing dopants. The good properties include not only glass stability but beneficial interactions with the lasing dopant, e.g. $Pr^{3+}$. In addition, the presence of bromide or iodide tends to increase the refractive index which is desirable for forming the path regions of waveguides.

In defining the quantitative composition of the glasses according to the invention it is convenient to specify the lasing dopant content, the metal content and the halide content separately.

The concentration of lasing dopants is conveniently specified as a percentage by weight based on the host glass.

The concentration of individual metals is conveniently expressed as a molar percentage based on the total metal content whereas the concentration of individual halides is conveniently expressed as a molar percentage based on the total halide content. It will be appreciated that the relative amounts of the metals and the halides is determined by the valances of the various metals (since the halides are all monovalent). In other words, the metals and the halides are present in stoichiometric proportions.

The quantitative composition of the halide content of host glasses according to the invention is as follows:—

W mole % of F—
X mole % of Br—
Y mole % of I—, and
Z mole % of Cl—;
wherein:
W+X+Y+Z=100,
X+Y+Z=0.05–15,
X+Y=0.05–6, preferably 2.5–5;
Z=0–10, preferably 3–6.

The requirement that W+X+Y+Z=100 is equivalent to the requirement that the molar % of each halide is specified on the total molar content of halides.

It has been found that compositions in which one of X or Y is 0 are particularly suitable. Two examples of such compositions are given, namely (A) Y=0; X=0.5–0.7 and Z=2.0–2.5
(B) X=0; Y=0.05–4.5 and Z=2.0–2.5

Having specified the halide content of the host glasses it is now convenient to consider the metal content. It has already been pointed out that the aluminium content is below 0.2 mole % and preferably zero and that the alkali metal content is desirably 10–39 mole %, preferably all as sodium.

The absence of aluminium tends to destabilise the glass but Y and/or In give better stability than Al in the presence of Br—, I— and Cl—. It is, therefore, preferred that at least one of Y and In is present. Preferably the total amount of Y+In is 1–10 mole % and the preferred molar ratio of Y and In is in the range 4:1 to 1:4, e.g. equimolar.

Other metals which may be present are as follows:—
Zr 45 mole %–65 mole %
Ba 17 mole %–25 mole %, and
La 3.5 mole %–5 mole %.

It is preferred that the total amount of Zr+Ba+La is less than 90 mole %.

The invention also includes lasing compositions which consist of a host glass as defined above and 0.001–4 wt %, preferably 0.001–0.1 wt %, based on the host glass composition of an active dopant capable of supporting fluorescence or lasing activity. Lasing dopants include the trivalent ions of a rare earth, e.g. $Er^{3+}$, $Nd^{3+}$ and, especially $Pr^{3+}$. The lasing dopant may also take the form of a plurality of species which interact to provide the required fluorescence.

In addition to the glasses defined above the invention also includes:—

(i) waveguides
(ii) optical amplifiers based on (i), and
(iii) method of amplifying.

The waveguides comprise a confining region and a path region, eg. the cladding and core of a fibre. The path region is a (host+lasing dopant) glass as defined above whereas the cladding is a compatible glass. The compatible glass is most suitably an all fluoride glass having a metal content selected from Zr, Hf, Ba, Al, Li, Na, Cs and La. Substantial proportions, eg. 40 to 50 mole %, of Zr+Hf and alkali metals, eg. 20 to 30 mole % based on the total metal content are particularly suitable.

The amplifier comprises a waveguide (fibre) having a lasing dopant located in its path region and a pump for supplying pump radiation into the path region. There are also input and output ports for connecting the path region to transmission systems.

Amplifying requires the simultaneous insertion of attenuated signals and pump radiation into a host glass which contains a lasing dopant. For telecommunications, the transition ($^1G_4$-$^3H_5$) of $Pr^{3+}$ is particularly suitable. This transition has a fluorescence maximum close to 1300 nm but it has a finite lasing bandwidth for signals with a nominal wavelength of 1300 nm. The inversion necessary for lasing can be produced by pumping at wavelengths within the range 1000–1030 nm, preferably 1010–1025 nm eg 1020 nm.

Nineteen compositions in accordance with the invention will now be described by way of example. In addition, two comparative compositions will also be described. The comparative compositions are not in accordance with the invention because they contain no iodide and no bromide.

The nineteen examples and the two comparisons were prepared by melting initial compositions in platinum crucibles. After melting, the glasses were cast e.g. as fibre preforms using centrifugal casting. All these operations were carried out under "clean" conditions, i.e. under a dust-free, pure, dry atmosphere. During the later stages of the melting the atmosphere preferably comprises oxygen but otherwise the atmosphere should be inert, e.g. nitrogen or helium.

The ingredients used to prepare the initial compositions of the nineteen examples and the two comparisons are given in table 1. The initial compositions were prepared by mixing together, e.g. in the crucible used for melting, the specified metal halides in the quantities specified. The metal halides were utilised in powder form to facilitate mixing. After mixing the crucibles were transferred to a furnace for the melting. The storage of the ingredients, the mixing and the transfer to the furnace were all carried out under "clean" conditions as specified above.

In addition to the ingredients specified in table 1, each of the initial compositions included $PrF_3$ to provide $Pr^{3+}$ as a lasing dopant. In each case the amount of $PrF_3$ was 0.05% by weight based on the total amount of the other ingredients.

TABLE 1

COMPOSITIONS OF THE INITIAL COMPOSITIONS USED TO PREPARE THE HOST GLASSES

| CODE | $ZrF_4$ | $BaF_2$ | $BaCl_2$ | $LaF_3$ | $YF_3$ | $InF_3$ | NaF | NaCl | NaBr | NaI |
|---|---|---|---|---|---|---|---|---|---|---|
| E01 | 52 | 20 | 0 | 4 | 2 | 2 | 15 | 0 | 5 | 0 |
| E02 | 52 | 20 | 0 | 4 | 2 | 2 | 10 | 0 | 10 | 0 |
| E03 | 52 | 20 | 0 | 4 | 2 | 2 | 5 | 0 | 15 | 0 |
| E04 | 52 | 20 | 0 | 4 | 2 | 2 | 0 | 0 | 20 | 0 |
| E05 | 52 | 15 | 5 | 4 | 2 | 2 | 13 | 5 | 2 | 0 |
| E06 | 52 | 15 | 5 | 4 | 2 | 2 | 11 | 5 | 4 | 0 |
| E07 | 52 | 15 | 5 | 4 | 2 | 2 | 9 | 5 | 6 | 0 |
| E08 | 52 | 15 | 5 | 4 | 2 | 2 | 7 | 5 | 8 | 0 |
| E09 | 52 | 15 | 5 | 4 | 2 | 2 | 5 | 5 | 10 | 0 |
| E10 | 52 | 15 | 5 | 4 | 2 | 2 | 3 | 5 | 12 | 0 |
| E11 | 52 | 20 | 0 | 4 | 2 | 2 | 15 | 0 | 0 | 5 |
| E12 | 52 | 20 | 0 | 4 | 2 | 2 | 10 | 0 | 0 | 10 |
| E13 | 52 | 20 | 0 | 4 | 2 | 2 | 5 | 0 | 0 | 15 |
| E14 | 52 | 15 | 5 | 4 | 2 | 2 | 13 | 5 | 0 | 2 |
| E15 | 52 | 15 | 5 | 4 | 2 | 2 | 11 | 5 | 0 | 4 |
| E16 | 52 | 15 | 5 | 4 | 2 | 2 | 9 | 5 | 0 | 6 |
| E17 | 52 | 15 | 5 | 4 | 2 | 2 | 7 | 5 | 0 | 8 |
| E18 | 52 | 15 | 5 | 4 | 2 | 2 | 5 | 5 | 0 | 10 |
| E19 | 52 | 15 | 5 | 4 | 2 | 2 | 3 | 5 | 0 | 12 |
| COMP A | 52 | 20 | 0 | 4 | 2 | 2 | 20 | 0 | 0 | 0 |
| COMP B | 52 | 15 | 5 | 4 | 2 | 2 | 15 | 5 | 0 | 0 |

Table 1 specifies the amount of each ingredient used to prepare each of the initial compositions. The figures in the table represent molar percentages based on the total initial composition. It is emphasised that table 1 defines the amount of each ingredient used to prepare the glasses. It is possible that the composition of the resulting glasses may differ from the ingredient proportions. This is because some of the ingredients, eg. zirconium and indium halides, are volatile. Furthermore, it appears that the halides, for metals in general, display differential volatility in the following order, iodide (most volatile), bromide, chloride and fluoride (least volatile). The effect is that the compositions of the glasses are different from the compositions of the initial compositions as specified in Table 1 above. In particular the glasses tend to contain less zirconium, indium, iodide, bromide and chloride than is indicated in Table 1.

It should be noted that all the initial compositions as specified in Table 1 have the same metal content. This metal content is conveniently expressed as molar percentages based on the total metal content and it is given in table 2.

TABLE 2

| Zr | Ba | La | Y | In | Na |
|---|---|---|---|---|---|
| 52 | 20 | 4 | 2 | 2 | 20 |

The total metal content of the initial compositions as specified in Table 2 is 100 because Table 2 is calculated to give the molar percentage of each metal. The total amount of halide associated with these metals works out at 292 moles because of the valencies of the various metals.

Table 3 gives the molar content of the initial composition for each individual halide. Table 3 has two regions each comprising one column for each of the halides F—, Br—, I— and Cl—. The first region, headed "TOTAL MOLE" shows how the total of 292 moles is divided amongst the various halides. The right hand zone of table 3 converts these figures into molar percentages based on the total halide content. This conversion is achieved by dividing each individual figure by 2.92 (ie. dividing by 292 as the total mole and multiplying by 100 to convert to percentage).

TABLE 3

| | TOTAL MOLES | | | | MOLE % OF HALIDES | | | |
|---|---|---|---|---|---|---|---|---|
| | F— | Br— | I— | Cl— | F— | Br— | I— | Cl— |
| E01 | 287 | 5 | 0 | 0 | 98.3 | 1.7 | 0 | 0 |
| E02 | 282 | 10 | 0 | 0 | 96.6 | 3.4 | 0 | 0 |
| E03 | 277 | 15 | 0 | 0 | 94.9 | 5.1 | 0 | 0 |
| E04 | 272 | 20 | 0 | 0 | 93.2 | 6.8 | 0 | 0 |
| E05 | 275 | 2 | 0 | 15 | 94.2 | 0.7 | 0 | 5.1 |
| E06 | 273 | 4 | 0 | 15 | 93.5 | 1.4 | 0 | 5.1 |
| E07 | 271 | 6 | 0 | 15 | 92.8 | 2.1 | 0 | 5.1 |
| E08 | 269 | 8 | 0 | 15 | 91.2 | 2.7 | 0 | 5.1 |
| E09 | 267 | 10 | 0 | 15 | 91.5 | 3.4 | 0 | 5.1 |
| E10 | 265 | 12 | 0 | 15 | 90.8 | 4.1 | 0 | 5.1 |
| E11 | 287 | 0 | 5 | 0 | 98.3 | 0 | 1.7 | 0 |
| E12 | 282 | 0 | 10 | 0 | 96.6 | 0 | 3.4 | 0 |
| E13 | 277 | 0 | 15 | 0 | 94.9 | 0 | 5.1 | 0 |

TABLE 3-continued

| | TOTAL MOLES | | | | MOLE % OF HALIDES | | | |
|---|---|---|---|---|---|---|---|---|
| | F— | Br— | I— | Cl— | F— | Br— | I— | Cl— |
| E14 | 275 | 0 | 2 | 15 | 94.2 | 0 | 0.7 | 5.1 |
| E15 | 273 | 0 | 4 | 15 | 93.5 | 0 | 1.4 | 5.1 |
| E16 | 271 | 0 | 6 | 15 | 92.8 | 0 | 2.1 | 5.1 |
| E17 | 269 | 0 | 8 | 15 | 91.2 | 0 | 2.7 | 5.1 |
| E18 | 267 | 0 | 10 | 15 | 91.5 | 0 | 3.4 | 5.1 |
| E19 | 265 | 0 | 12 | 15 | 90.8 | 0 | 4.1 | 5.1 |

Important properties of the nineteen examples and two comparisons were measured and these results are given in Table 4.

TABLE 4

| ACRONYM | LIFE $\mu s$ | RI | $T_x$-$T_g$ degrees K. | EXPANSION $10^{-6} K^{-1}$ |
|---|---|---|---|---|
| COMP A | 126 | 1.504 | 83 | 20.6 |
| COMP B | 163 | 1.517 | 76 | 20.5 |
| E01 | 120 | 1.502 | 88 | 20.5 |
| E02 | 121 | 1.515 | 92 | 20.3 |
| E03 | 139 | 1.520 | 113 | 20.3 |
| E04 | 139 | 1.528 | 82 | 20.3 |
| E05 | 144 | 1.517 | 88 | 20.5 |
| E06 | 142 | 1.518 | 93 | 20.5 |
| E07 | 154 | 1.523 | 93 | 20.3 |
| E08 | 165 | 1.526 | 91 | 20.1 |
| E09 | 165 | 1.528 | 104 | 20.1 |
| E10 | 165 | 1.534 | 25 | 20.1 |
| E11 | 118 | 1.500 | 90 | 20.3 |
| E12 | 131 | 1.502 | 55 | 20.1 |
| E13 | 123 | 1.512 | 92 | 19.5 |
| E14 | 149 | 1.517 | 88 | 20.5 |
| E15 | 147 | 1.520 | 92 | 20.5 |
| E16 | 152 | 1.521 | 63 | 20.3 |
| E17 | 160 | 1.523 | 103 | 20.0 |
| E18 | 160 | 1.524 | 97 | 20.0 |
| E19 | 160 | 1.526 | 105 | 20.0 |

The performance parameters specified in Table 4 were measured on the glasses which resulted from the initial compositions specified in Table 1. It has already been mentioned that the composition of the glasses is not identical to the compositions of initial ingredients. Nevertheless, the performance parameters quoted in Table 4 relate, in each case, to the glass which resulted from the specified initial ingredients.

The column headed "LIFE" in table 4 gives the fluorescent lifetime of the $Pr^{3+}$ in the specified host. The fluorescence was stimulated by pump radiation at 1020 nm provided from an $Ar^+$ pumped Ti:saphire laser. The lifetime specifies the decay of fluorescence after the pump has been switched off. The fluorescence is at 1300 nm and it corresponds to the lasing transition ($^1G_4$-$^3H_5$) which would be needed in a telecommunications amplifier operating at this wavelength. The efficiency of the laser is proportional to the lifetime.

The column headed "$T_x$-$T_g$" gives the difference between the two significant temperatures. $T_x$ is the temperature of the onset of crystallisation and $T_g$ is the glass transition temperature. Both of these are read off from differential scanning calorimetry curves obtained using an isochronal heating rate of 20° C./minute. The difference ($T_x$-$T_g$) represents the stability of the glass during fibre drawing and it is desirable that this difference be as high as possible. As stated this important difference is quoted in table 4.

The column headed "EXPANSION" in table 4 gives the co-efficient of linear expansion of the relevant glass. This parameter has little significance by itself but it is desirable that the core and the cladding of the fibre should have similar co-efficients of expansion to avoid separation during the large changes of temperature which occur during fibre drawing.

The column headed "RI" gives the refractive index of the glass. This parameter is clearly important in waveguides and, since the lasing glass is used as the core of fibres, it is desirable that the refractive index be as high as possible.

The refractive index and the life have been copied from Table 4 into Table 5 but the results have been rearranged to facilitate comparison. Table 5 contains two major zones in which the left hand zone relates to compositions which are chloride-free and the right-hand zone relates to glasses which were derived from initial ingredients which contained 5.1% mole of chloride in their reactants. Each zone is divided into two regions one of which refers to bromides and the other to iodides in the initial ingredients compositions. The left hand column of Table 5 indicates the percentage of bromide or iodide as indicated in Table 3. The line specified as zero at the left relates to comparative compositions in which there is no bromine or iodine.

TABLE 5

| MOLE % Br— or I— | NO Cl— | | | | 5.1 MOLE % Cl— | | | |
|---|---|---|---|---|---|---|---|---|
| | Br— | | I— | | Br— | | I— | |
| | RI | LIFE | RI | LIFE | RI | LIFE | RI | LIFE |
| 0 | 1.504 | 126 | 1.504 | 126 | 1.517 | 163 | 1.517 | 163 |
| 0.7 | | | | | 1.517 | 144 | 1.517 | 149 |
| 1.4 | | | | | 1.518 | 142 | 1.520 | 147 |
| 1.7 | 1.502 | 120 | 1.500 | 118 | | | | |
| 2.1 | | | | | 1.523 | 154 | 1.521 | 152 |
| 2.7 | | | | | 1.526 | 165 | 1.523 | 160 |
| 3.4 | 1.515 | 121 | 1.502 | 131 | 1.528 | 165 | 1.524 | 160 |
| 4.1 | | | | | 1.534 | 165 | 1.526 | 160 |
| 5.1 | 1.520 | 139 | 1.512 | 123 | | | | |
| 6.8 | 1.528 | 139 | | | | | | |

As stated above, parameters quoted in Table 5 should be as high as possible. For the retractive index it appears that high concentrations of bromide and iodide are appropriate but glass stability also needs to be taken into account.

The difference ($T_x$-$T_g$) has been copied from Table 4 into Table 6 which is organised like Table 5.

TABLE 6

| MOLES Br— or I | NO Cl— | | 5.1 MOLE % C— | |
|---|---|---|---|---|
| | Br— | I— | Br— | I— |
| 0 | 83 | 83 | 76 | 76 |
| 0.7 | | | 88 | 88 |
| 1.4 | | | 93 | 92 |
| 1.7 | 88 | 90 | — | — |
| 2.1 | | | 93 | 63 |
| 2.7 | | | 93 | 103 |
| 3.4 | 92 | 55 | 104 | 97 |
| 4.1 | | | 25 | 105 |
| 5.1 | 113 | 92 | — | — |
| 6.8 | 82 | | — | — |

It can be seen that even small amounts of bromide or iodide enhance the glass stability in that ($T_x$-$T_g$) is increased. However, very large amounts of bromide or iodide, eg. above about 5% tend to degrade the glass stability. It is, therefore, desirable to use the highest amounts of bromide or iodide compatible with glass stability.

One of the difficulties with halide glasses is the high rates of cooling with are necessary to convert a liquid into the glass state. If the rate of cooling is too slow the composition tends to crystallise and avoiding this crystallisation can be difficult because of the high cooling rate involved. We have noted that even small quantities of bromide or iodide assist in achieving a glass state at relatively low rates of cooling.

The results given in table 4 show that even small quantities of bromide or iodide improve the stability of the glass. However, if excessive amounts, eg over 6 mole % of bromide plus iodide, is incorporated the beneficial effects of these two halide appears to be reversed. The improvements are indicated by an increase in the parameter ($T_x$-$T_g$).

The presence of bromide or iodide also enhances the optical performance of the glass, eg the lasing performance and the refractive index. In these cases it appears desirable to have concentrations of at least about 2.5 mole % of bromide or iodide before benefits are achieved. To achieve maximum optical effects it appears desirable to use as much bromide or iodide as is compatible with acceptable glass stability. It is considered that compositions E09 and E19, as specified in Tables 1 and 2, show particularly good combination of glass and optical properties.

It must be emphasised that the beneficial effects described above were obtained on compositions which contained no lead and aluminum. It is an important feature of this invention that lead and aluminum contents be low, preferably zero. The desirable properties described above have not been obtained where glasses contained substantial amounts of lead and aluminum as well as the halide chloride, bromide or iodide. European patent application 535798 A2 (mentioned above) requires the presence of large proportions of lead fluoride but it only exemplifies all-fluoride glasses.

The glasses described above are intended for use as the path regions of optical fibres and the $Pr^{3+}$ which is contained in the glasses is capable of lasing at 1300 nm and the fibre is suitable for making optical amplifiers.

A suitable optical amplifier configuration is illustrated, diagrammatically, in the accompanying drawing. The actual amplification is carried out in a fibre waveguide 10 which has a path region formed of a glass in accordance with the invention. Thus the path region is a mixed halide glass containing $Pr^{3+}$ as the lasing dopant. The cladding of the fibre is, conveniently, a compatible fluoride glass. At its input end the fibre 10 is optically connected to an input port 11 and at its other end to an output port 12. Both the input port 11 and output port 12 are conveniently formed of a silica fibre so that the amplifier is conveniently connected into a telecommunications system wherein silica fibre is, conventionally, used for transmission. A pump 13 is connected to the fibre 10 via a wavelength multiplexer 15. Pump 13 provides the power to drive the lasing of dopant $Pr^{3+}$. It is convenient to provide a splitter 12 which removes a small proportion, e.g. 1–5% of the amplified signals for monitoring. The splitter 12 is connected to control equipment 14 which monitors the strength of amplified signal. Control equipment 14 is optically connected to the pump 13 so as to increase or decrease the pump power in order to keep the output of the amplifier at a constant level. The control equipment 14 may also provide alarms when the output of the amplifier falls below a threshold level. The invention as described above also includes a glass containing 10–39 mole % of sodium based on the total metal content, sodium being the only alkali metal present in the glass and wherein the concentration of sodium is 15–25 mole %.

The invention also includes a method of preparing a halide glass composition wherein the ingredients contain:

45 to 64 mole % of zirconium fluoride,
3.5 to 5.0 mole % of lanthanum fluoride,
1 to 10 mole % of fluorides of indium and/or yttrium together with 17 to 25 mole % of barium halides and,
15 to 25 mole % of sodium halide;

wherein the halides of barium and sodium provide the chloride, bromide, or iodide needed to give the concentration specified above.

What is claimed is:

1. A halide glass composition having fluorescent or lasing properties wherein said composition consists of:
    an active dopant capable of supporting fluorescent or lasing activity and a host glass,
    wherein the concentration of the active dopant is 0.001 to 4 weight percent based on the host glass;
    the host glass containing less than 0.2 mole % of aluminium and less than 0.2 mole % of lead based on the total metal content and the halide content consisting of:
    W mole % of F—,
    X mole % of Br—,
    Y mole % of I—,
    Z mole % of Cl—,
    wherein
    W+X+Y+Z=100
    and each of the following expressions lies within the range specified:

| MIN | EXPRESSION | MAX |
|---|---|---|
| 0.05 | X + Y + Z | 15 |
| 0.05 | X + Y | 6 |
| 0 | Z | 10 | and wherein
Y=0;
X=0.5 to 0.7;
Z-2.0 to 2.5.

2. A halide glass composition having fluorescent or lasing properties wherein said composition consists of:
    an active dopant capable of supporting fluorescent or lasing activity and a host glass,
    wherein the concentration of the active dopant is 0.001 to 4 weight percent based on the host glass:
    the host glass containing less than 0.2 mole % of aluminium and less than 0.2 mole % of lead based on the total metal content and the halide content consisting of:
    W mole % of F—,
    X mole % of Br—,
    Y mole % of I—,
    Z mole % of Cl—,
    wherein
    W+X+Y+Z=100
    and each of the following expressions lies within the range specified:

| MIN | EXPRESSION | MAX |
|---|---|---|
| 0.05 | X + Y + Z | 0.5 |
| 0.05 | X + Y | 6 |
| 0 | Z | 10 | and wherein
X=0
Y=0.05 to 4.5;
Z=2.0 to 2.5.

3. A halide glass composition having fluorescent or lasing properties wherein said composition consists of:
an active dopant capable of supporting fluorescent or lasing activity and a host glass,
wherein the concentration of the active dopant is 0.001 to 4 weight percent based on the host glass;
the host glass containing less than 0.2 mole % of aluminium and less than 0.2 mole % of lead based on the total metal content and the halide content consisting of:
W mole % of F—,
X mole % of Br—,
Y mole % of I—,
Z mole % of Cl—,
wherein
W+X+Y+Z=100
and each of the following expressions lies within the range specified:

| MIN | EXPRESSION | MAX |
| --- | --- | --- |
| 0.05 | X + Y + Z | 15 |
| 0.05 | X + Y | 6 |
| 0 | Z | 10 | and wherein the host glass contains In and/or Y wherein the total concentration of In+Y is 1 to 10 mole % based on the total metal content.

4. A halide glass composition having fluorescent or lasing properties wherein said composition consists of:
an active dopant capable of supporting fluorescent or lasing activity and a host glass,
wherein the concentration of the active dopant is 0.001 to 4 weight percent based on the host glass;
the host glass containing less than 0.2 mole % of aluminium and less than 0.2 mole % of lead based on the total metal content and the halide content consisting of:
W mole % of F—,
X mole % of Br—,
Y mole % of I—,
Z mole % of Cl—,
wherein
W+X+Y+Z=100
and each of the following expressions lies within the range specified:

| MIN | EXPRESSION | MAX |
| --- | --- | --- |
| 0.05 | X + Y + Z | 15 |
| 0.05 | X + Y | 6 |
| 0 | Z | 10 | and wherein the host glass contains 45 to 65 mole % of Zirconium based on the total metal content.

5. A glass as in claim 4, wherein the host glass also contains:
17–25 mole % of Ba, and
3.5–5.0 mole % of La,
subject to the condition that the total amount of Zr+Ba+La is less than 90 mole %, all the percentages being based on the total metal content.

6. A method of preparing a halide glass compositon having fluorescent or leasing properties which comprises:
melting together a mixture of solid ingredients, each of said ingredients being the halide of a metal and the ingredients containing less than 0.2 mole % of aluminium and less than 0.2 mole % of lead based on the total metal content and wherein the halide content consists of:
W mole % of F—,
X mole % of Br—,
Y mole % of I—,
Z mole % of Cl—,
wherein
W+X+Y+Z=100
and each of the following expressions lies within the range specified:

| MIN | EXPRESSION | MAX |
| --- | --- | --- |
| 0.05 | X + Y + Z | 15 |
| 0.05 | X + Y | 6 |
| 0 | Z | 10 | said ingredients also containing 0.001 to 4 weight percent based on the other ingredients of a dopant being the halide of a metal capable of supporting fluorescent or lasing activity;
wherein the ingredients contain:
45 to 64 mole % of Zirconium fluoride,
3.5 to 5.0 mole % of lanthanum fluoride,
1 to 10 mole % of fluorides of indium and/or yttrium together with 17 to 25 mole % of barium halides and,
15 to 25 mole % of sodium halide; and
wherein the halides of barium and sodium provide the chloride, bromide, or iodide needed to give the concentration specified above.

* * * * *